United States Patent [19]

Ende

[11] Patent Number: 4,642,715
[45] Date of Patent: Feb. 10, 1987

[54] ENVIRONMENTAL CONDITIONING AND SAFETY SYSTEM FOR DISK-TYPE MASS MEMORIES

[75] Inventor: Don S. Ende, Commack, N.Y.

[73] Assignee: Miltope Corporation, Melville, N.Y.

[21] Appl. No.: 667,121

[22] Filed: Nov. 1, 1984

[51] Int. Cl.⁴ .............................................. G11B 23/04
[52] U.S. Cl. ......................................... 360/97; 360/98
[58] Field of Search ....................... 360/71, 75, 98, 99, 360/97

[56] References Cited

U.S. PATENT DOCUMENTS

| | | | |
|---|---|---|---|
| 2,702,089 | 2/1955 | Engelder | 183/4.8 |
| 3,853,475 | 12/1974 | Gordon et al. | 23/252 |
| 4,130,845 | 12/1978 | Kulma | 360/98 |
| 4,143,408 | 3/1979 | McGinnis et al. | 360/98 |
| 4,249,221 | 2/1981 | Cox et al. | 360/97 |
| 4,285,018 | 8/1981 | Mulvaney et al. | 360/98 |
| 4,292,656 | 9/1981 | Fujioka | 360/97 |
| 4,307,425 | 12/1981 | Kaneko et al. | 360/98 |
| 4,317,146 | 2/1982 | Gervais | 360/98 |
| 4,329,722 | 5/1982 | West | 360/98 |
| 4,363,056 | 12/1982 | Riggle et al. | 360/98 |
| 4,367,502 | 1/1983 | Iftikar et al. | 360/98 |
| 4,369,475 | 1/1983 | Ho et al. | 360/97 |
| 4,377,830 | 3/1983 | Patel | 360/98 |
| 4,396,964 | 8/1983 | Morehouse et al. | 360/98 |
| 4,412,261 | 10/1983 | Tateyama et al. | 360/98 |
| 4,418,369 | 11/1983 | Applequist et al. | 360/98 |
| 4,429,336 | 1/1984 | Berube et al. | 360/97 |
| 4,488,193 | 12/1984 | Davis et al. | 360/98 |

FOREIGN PATENT DOCUMENTS

| | | |
|---|---|---|
| 0008690 | 3/1980 | European Pat. Off. . |
| 0010606 | 5/1980 | European Pat. Off. . |
| 0020933 | 1/1981 | European Pat. Off. . |
| 0038030 | 10/1981 | European Pat. Off. . |
| 0123130 | 10/1984 | European Pat. Off. . |
| 1160152 | 7/1969 | Fed. Rep. of Germany . |
| 1379396 | 1/1975 | United Kingdom . |
| 1397437 | 6/1975 | United Kingdom . |
| 1417780 | 12/1975 | United Kingdom . |

*Primary Examiner*—Stuart N. Hecker
*Assistant Examiner*—Alyssa H. Bowler
*Attorney, Agent, or Firm*—Gottlieb, Rackman & Reisman

[57] ABSTRACT

An environmental conditioning and safety system for use with disk-type mass memories includes a barometric sensor, a replaceable desiccant cartridge, a finned heat sink cover plate, a breather filter, check valving and a flow restrictor. The system is especially suited for use in harsh environments, such as may be encountered in oil and gas exploration and in military use.

11 Claims, 10 Drawing Figures

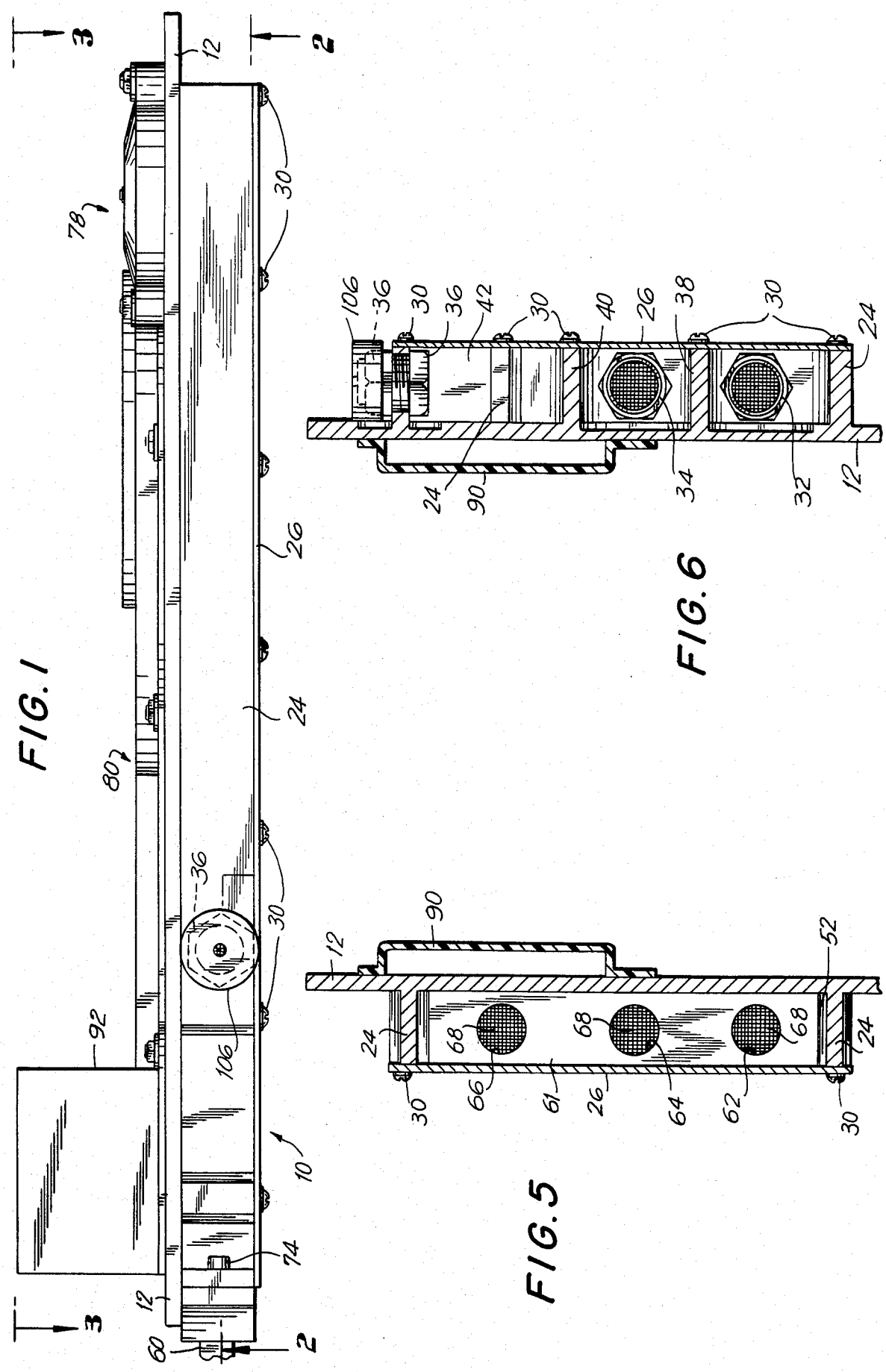

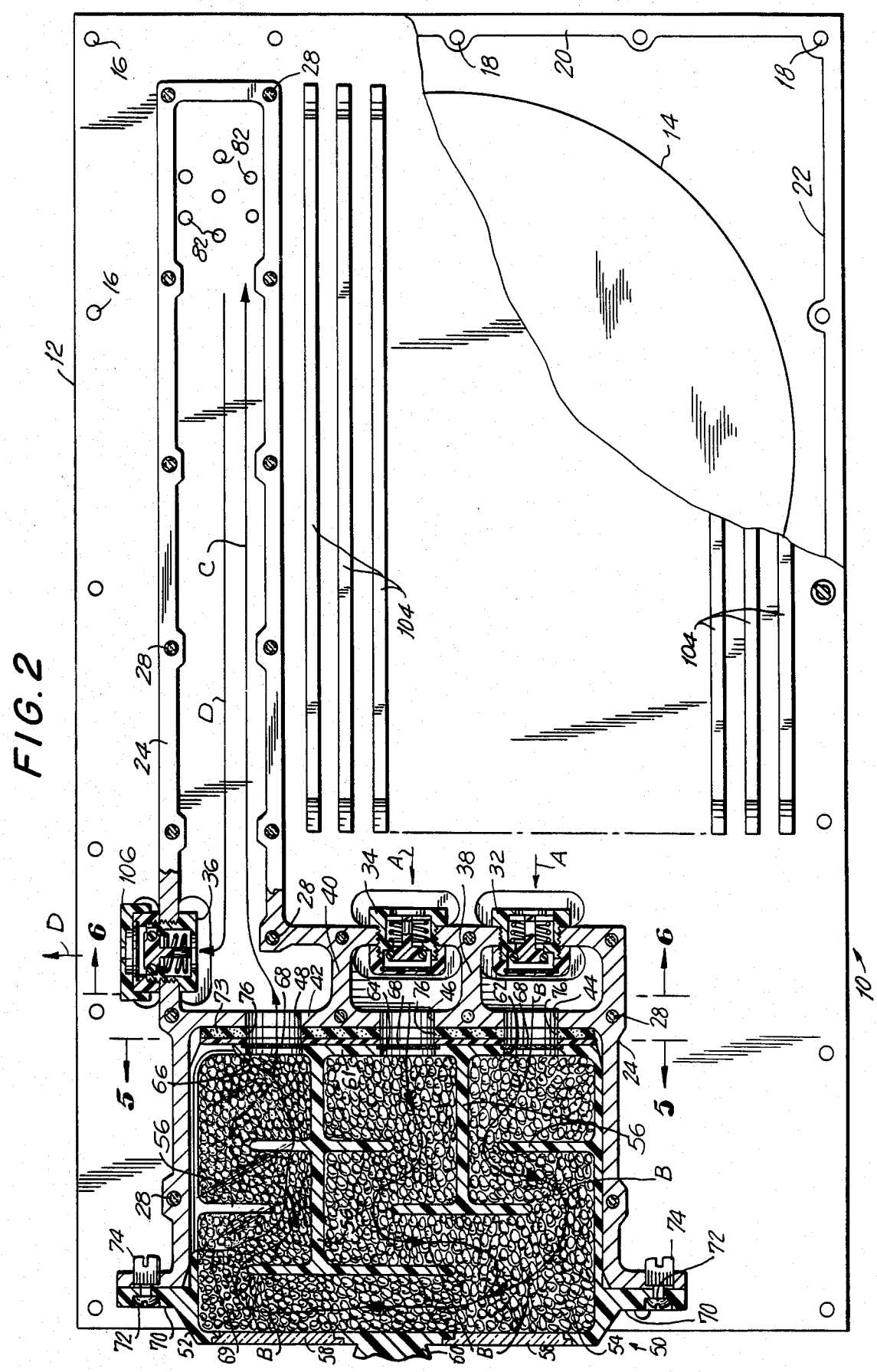

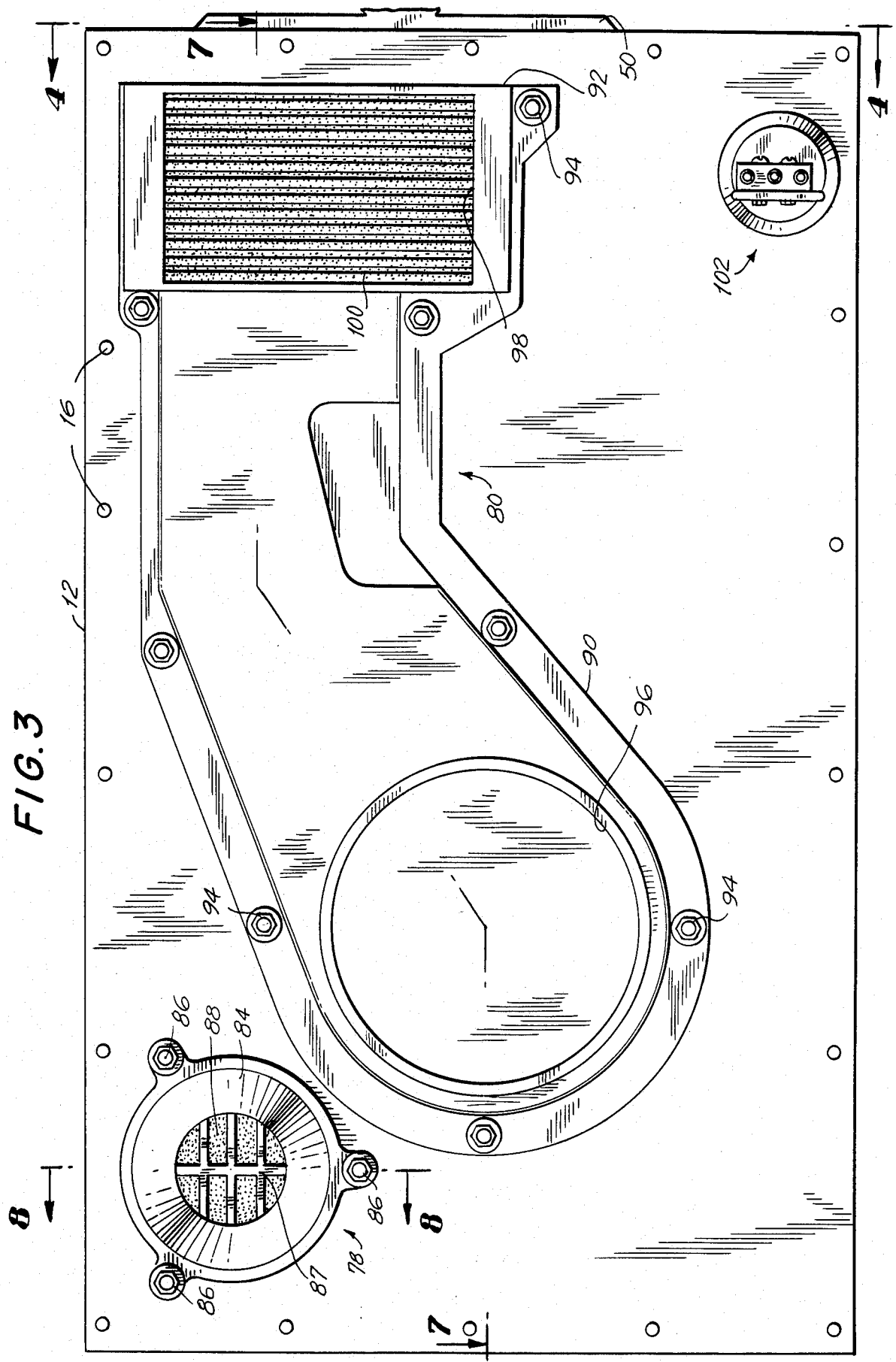

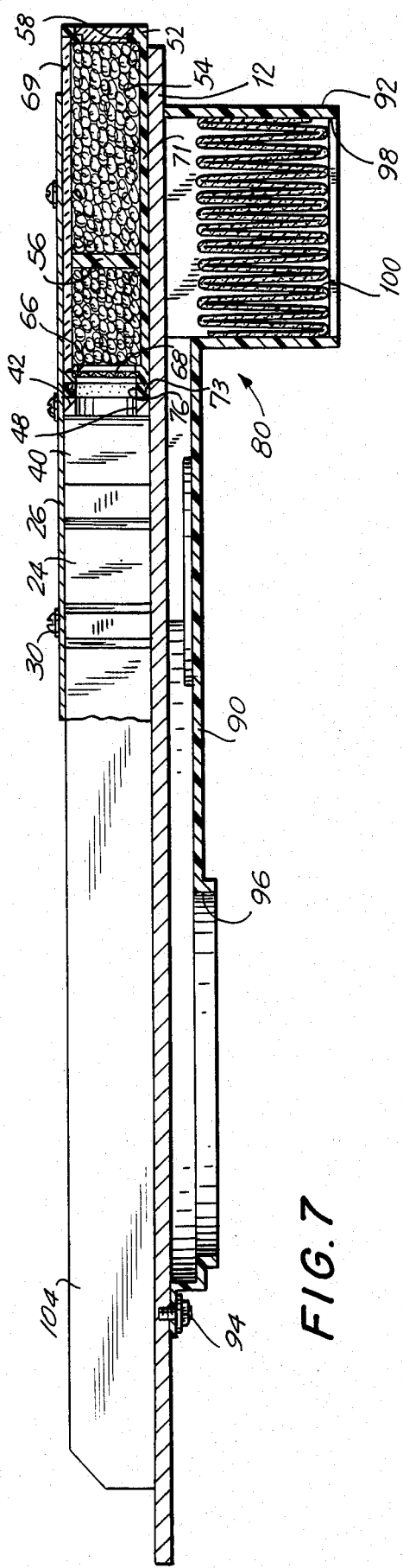
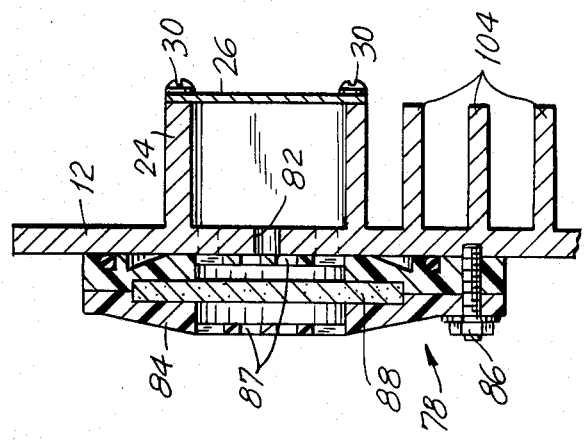

ENVIRONMENTAL CONDITIONING AND SAFETY SYSTEM FOR DISK-TYPE MASS MEMORIES

DESCRIPTION

This invention relates generally to mass information storage units for use with digital computers, and more particularly, to an environmental conditioning and safety system for disk-type mass memory units.

Data processing systems, such as microcomputers, minicomputers, word processing equipment and related equipment for data storage and data handling applications, typically include one or more mass information storage units in which data can be written on or retrieved from a magnetic, optical or other type of recording medium. In modern data storage units, a magnetic medium typically may be deposited on and supported by an annular substrate such as aluminum. This disk is mounted in a disk drive apparatus in which it is rapidly rotated about its axis by a drive motor. The drive includes read/write heads (having small coils for detecting and storing data) which can be moved across the disk surface either on a carriage by a linear actuator or on a swing arm by a rotary actuator in the drive to permit any one of a series of concentric annular data tracks to be accessed while the disk is spinning, the tracks being disposed on the substrate at differing radii. In this fashion, portions of the magnetic medium anywhere on the disk can be randomly accessed at high speed for either retrieving or storing data. A drive may contain either a single disk or several disks stacked in spaced-apart relation on a common spindle, separated by spacer rings.

It has been an objective in recent years to increase the amount of data that can be stored on each disk, as well as the density at which the data is stored on the medium. This has necessitated an improvement not only in the magnetic medium itself, but also in the techniques used in manufacturing the drive, as rigid mechanical tolerances must be maintained to ensure that the read/write heads maintain the proper spacings over the disks. However, when high density disks are employed, care must be taken to minimize contaminants such as dust and the like. In such equipment the read/write heads are disposed very close to the disk surface during the read/write operations. The heads ride on a thin layer of air created by the spinning disk, with the heads being in close proximity to but spaced from the disk surface. In particular, rotation of the disk causes the recording head, which is configured as a hydrodynamic bearing, to "fly" during operation at 10 to 20 micro-inches above the disk's surface. Any particles on the surface of the disk will interfere with the spacing of the heads and prevent proper operation. In many instances, particles of dust or debris, submicron in size, may lodge between the disk surface and the associated read/write head and cause a "crash," resulting in outright destruction of the disks and heads. Moreover, if dust is permitted to accumulate, the read/write head may have to fly farther from the disk, requiring the use of higher head flux densities and reducing the available storage densities. The dust on the surface can also cause excessive wear on the head and slider, even if no "crash" occurs.

To increase the reliability of the high-density mass storage disk, the so-called "Winchester"-type fixed hard disk drive was developed, in which the disks, the read/write heads and their actuating assemblies are all mounted in a housing which is sealed to keep dust and other contaminants away from the disks. These disk drives make use of very lightly loaded, low mass magnetic recording heads which are generally referred to as "Winchester" heads.

In typical "Winchester"-type disk drives, the disk housing comprises a cast metal base and a separate cover plate which completes and seals the housing. A gasket may be used between the base and the cover to enhance the sealing. The cover extends over the portion of the base necessary to enclose the disks and the head actuator assemblies in a substantially sealed head/disk compartment, usually known as a head/disk assembly or HDA. This HDA is typically assembled in a dust-free environment known as a "clean room."

A drive motor for rotating the disks is typically coupled directly to a disk spindle shaft projecting through the bottom of the HDA. The drive also typically includes power supplies for driving the motor, head actuator and drive control logic circuitry to facilitate reading and writing the data from and onto the disks.

Filtered air may be directed over the annular disk surfaces to guard against the accumulation on the disks of any incidental dust which may have existed in the housing. Air from outside the sealed housing typically passes through a breather filter in the housing, allowing pressure equalization to take place between the head/disk compartment and the ambient, and air flow within the sealed housing created by the spindle and disk rotation is filtered by a recirculating air filter.

Apart from contaminants of a particulate nature, certain other environmental factors are critical for the proper and reliable operation of both optical and magnetic fixed hard disk storage media, particularly disk drives suited for use in harsh environments such as those encountered in the field in oil and gas exploration, or in military tactical use. These environmental factors include the humidity and temperature of the air within the sealed housing, as well as the barometric pressure within the housing.

With regard to temperature, substantial amounts of heat are generated during normal operation of a fixed hard disk drive. Some heat is generated by the rotation of the disks themselves, usually at speeds of the order of 3,600 revolutions per minute. In addition, the magnetic recording head actuator assembly commonly includes a voice coil motor which generates heat within the sealed head/disk compartment. However, excessively high temperatures can degrade the disk's oxide coating, cause puddling of the disk's lubricant and also create thermal distortion which could affect read/write head positioning accuracy and seriously degrade performance. Accordingly, maintaining the proper operating temperature range, especially within the head/disk compartment, is crucial to the operation of a disk-type mass memory.

With respect to humidity, the air exchange which takes place during startup and shutdown of the disk drive, resulting from an attempt to equalize pressure between the sealed head/disk compartment and the ambient, can bring moist air into the head/disk compartment through the breather filter. This can lead to condensation on the disks and heads themselves. However, low levels of humidity are required in the head/disk compartment because of the low flying heights of the heads. Small droplets of condensed moisture on the disks or heads can lead to degradation in the operation of the disk drive, and in many cases to outright destruction of disks and heads as a result of a "head crash."

Regarding barometric pressure, although a mechanism for equalization of pressure is necessary, it is also important to prevent sudden depressurization of the disk drive when a low pressure condition is encountered, such as in a military aircraft which has experienced a loss of cabin pressure, and to provide sensory and signal means to insure automatic shutdown of the disk drive under such conditions. Since the hydrodynamic bearing action of the read/write heads is dependent upon air pressure, air viscosity and mean free path, depressurization of the disk drive to a pressure equivalent to an altitude of 10,000 feet will reduce the flying height of the read/write heads, resulting in a possible "head crash."

While the prior art includes various types of environmental control systems for fixed hard disk storage media, none of these systems addresses all of the foregoing environmental factors in an integrated fashion, and none provides monitoring of the barometric pressure within the disk drive so as to avoid damage to the disks and read/write heads upon encountering a sudden reduction in atmospheric pressure.

It is therefore a principal object of the present invention to provide an environmental conditioning and safety system for fixed hard disk storage media which can maintain a safe minimum pressure in the head/disk compartment at all times.

Another object of the present invention is to provide an environmental conditioning and safety system for fixed hard disk storage media which can maintain the temperature of the head/disk compartment below an established safe level.

It is a further object of the present invention to provide an environmental conditioning and safety system for fixed hard disk storage media which can maintain a relatively low humidity within the head/disk compartment in order to avoid condensation.

Still another object of the present invention is to provide an environmental conditioning and safety system for fixed hard disk storage media which can maintain extreme cleanliness in the head/disk compartment.

A still further object of the present invention is to provide an environmental conditioning and safety system for fixed hard disk storage media which is self-contained and constructed integrally with the disk drive housing.

Briefly, in accordance with the principles of the present invention, an environmental conditioning and safety system for disk-type mass memories comprises means for exchange of air between the head/disk compartment and the ambient, means for drying and filtering the air drawn in by the air exchange means, means for dissipation of heat generated within the head/disk compartment, means for preventing rapid depressurization of the head/disk compartment, and means for sensing and signalling a low barometric pressure condition to enable shutdown of the disk drive.

Preferably, the air exchange means includes a manifold on which air intake means and air exhaust means are disposed. The manifold is also adapted to releasably retain the air drying means, which consists of a replaceable desiccant cartridge, in series with the intake air stream. The filtering means preferably includes both a breather filter and a recirculating air filter, while the prevention means consists of a flow restrictor. Heat is dissipated through a finned heat sink, and an altitude pressure switch, preferably disposed within the head/disk compartment, alternately triggers an automatic shut-down or an automatic re-start of the disk drive upon encountering pre-selected threshold barometric pressure levels.

Further objects, features and advantages of the present invention will become more readily apparent from an examination of the following specification, when taken in conjunction with the drawings, wherein:

FIG. 1 is a side elevational view of a disk drive cover plate, illustrating an environmental conditioning and safety system constructed in accordance with the present invention;

FIG. 2 is a top cross-sectional view, partly broken away, taken substantially along the lines 2—2 of FIG. 1, and showing the disk drive cover plate positioned adjacent to its base;

FIG. 3 is a bottom plan view, taken substantially along the lines 3—3 of FIG. 1;

FIG. 5 is an enlarged, cross-sectional view, taken substantially along the lines 5—5 of FIG. 2;

FIG. 6 is an enlarged, cross-sectional view, taken substantially along the lines 6—6 of FIG. 2;

FIG. 7 is a cross-sectional view, taken substantially along the lines 7—7 of FIG. 3;

FIG. 8 is an enlarged, cross-sectional view, taken substantially along the lines 8—8 of FIG. 3;

Figure 10:
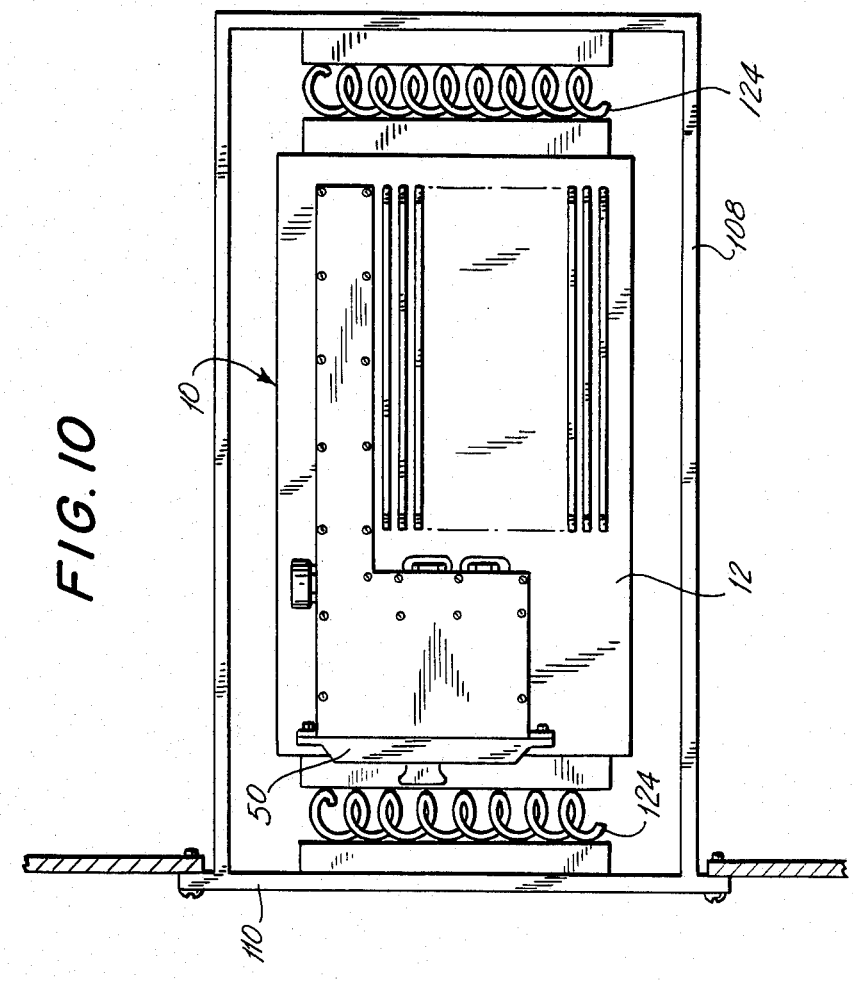
FIG. 10 is reduced, side view, partly in cross-section, of the installation of FIG. 9.

Referring now to the drawings, and in particular to FIGS. 1 and 2, an environmental conditioning and safety system (hereinafter "ECSS") for disk-type mass memories is generally designated 10. ECSS 10 is preferably mounted, as shown in the drawings, directly on the generally rectangular cover plate 12 of a disk housing containing rotating disks 14 (shown partly exposed in FIG. 2), as well as read/write heads and their actuating assemblies (not shown). Cover plate 12 is preferably fabricated of metal, and most preferably is an aluminum alloy casting. Cover plate 12 is provided about its periphery with attachment means including a plurality of holes 16 spaced for registration with a corresponding number of tapped holes 18 in the metal base 20 (see FIG. 2) to receive screws (shown in FIG. 9)

Figure 4:
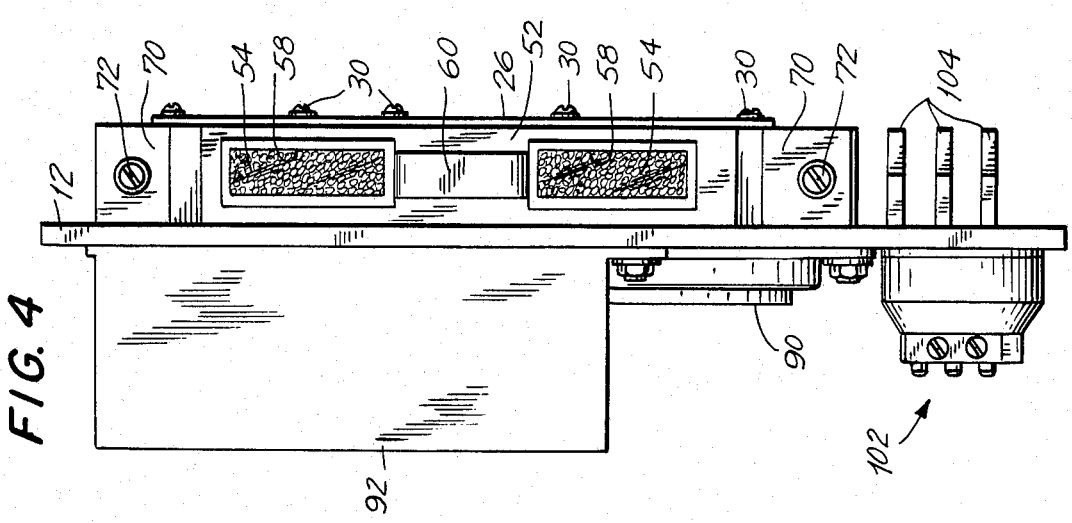
FIG. 4 is an end view, taken substantially along the lines 4—4 of FIG. 3.

Referring now to FIGS. 4–6 in addition to FIGS. 1 and 2, ECSS 10 includes means for exchange of air between the head/disk compartment 22 and the surrounding atmosphere. The air exchange means includes an air exchange manifold 24 and a removable manifold cover 26. Preferably, manifold 24 is fabricated integrally with cover plate 12, as shown in FIGS. 5 and 6. Attachment means for manifold cover 26 includes a plurality of holes (not shown) spaced for registration with a corresponding number of bores 28 in manifold 24, and adapted to receive screws 30.

The air exchange means of ECSS 10 also includes air intake means, preferably comprising a pair of air inlet check valves 32, 34, as well as air exhaust means, preferably comprising an air outlet check valve 36. Check valves 32, 34, 36 are of conventional construction, and are preferably identical to one another except for their orientation. As shown best in FIG. 2, air inlet check valves 32, 34 are oriented to allow air only to enter manifold 24, while air outlet check valve 36 only allows air to exit from manifold 24. All three check valves preferably have a very low cracking pressure, most preferably around 0.1 psig. An acceptable check valve is the Roberts Model 770RP one-way relief valve, available commercially from Halkey-Roberts Corporation of Paramus, N.J.

As shown in FIGS. 2 and 6, air exchange manifold 24 includes interior dividing walls 38, 40, which isolate air inlet check valves 32, 34 from one another and from air outlet check valve 36. Air exchange manifold 24 further includes an end wall 42 having air communication ports 44, 46, 48. As shown best in FIG. 2, air communication ports 44 and 46 are substantially aligned with air inlet check valves 32, 34, respectively, while air communication port 48 is located adjacent to but not necessarily aligned with air outlet check valve 36.

ECSS 10 also includes means for drying the air drawn in by the air exchange means. In the preferred embodiment, the drying means includes a removable desiccant cartridge, generally designated 50, which is connected in series with the air exchange means. Desiccant cartridge 50 includes a container 52 for the desiccant material 54, which is preferably a "molecular sieve" in bead form, intermingled with other beads of silica gel that change color when a given amount of moisture has been absorbed. A satisfactory desiccant/indicator mixture is the 4A Molecular Sieve Desiccant, 15% indicating, available from the Applied Science Division of Milton Roy Laboratory Group of Gardena, Calif. This product contains 85% by weight of the molecular sieve, which absorbs 22% of its weight in water, and 15% by weight of the silica gel indicator, which absorbs 17% of its weight in water and changes from blue to pink when the desiccant is saturated.

As shown in FIGS. 2, 4 and 5, the desiccant container 52 preferably has a rectangular configuration, and includes a plurality of internal baffles 56, the preferred arrangement of which is illustrated in FIG. 2. As shown best in FIG. 4, the container 52 also includes, along one edge thereof, viewing windows 58 and a handle 60. At the opposite edge, container 52 includes a rear plate 61 with air inlet openings 62, 64 and air outlet opening 66, as shown best in FIG. 5. Air inlet openings 62, 64 and air outlet opening 66 each include retaining means, preferably in the form of wire screens 68. The mesh of wire screens 68 is preferably chosen so as to prevent release of the beads of desiccant material 54. For this purpose, an 8×12 mesh, Tyler standard screen size, is suitable for use with the commercially-available desiccant mixture mentioned above.

The walls, sides and edges of desiccant container 52 may be fabricated of any appropriate rigid substance, preferably a hard plastic material such as polycarbonate or polysufone, and baffles 56 and handle 60 are preferably fabricated integrally of the same material. Viewing windows 58, as well as one entire wall 69 of the desiccant container 52, are preferably fabricated of a transparent plastic material such as transparent polycarbonate, and are secured in place with a conventional silicone rubber RTV adhesive, available commercially from Dow Chemical Company of Midland, Mich. As shown in FIG. 2, the baffles 56 as well as the desiccant material 54 are visible through the transparent wall 69 of the container 52. In order to maximize moisture absorption, the spaces between the baffles 56 of container 52 are substantially filled with the desiccant material 54, which is preferably inserted into container 52 through an access hole (not shown) located in the wall 71 opposite the transparent wall 69 of container 52 (see FIG. 7).

As shown in FIG. 2, air exchange manifold 24 is configured to receive desiccant cartridge 50 such that the rear plate 61 of container 52 is adjacent to end wall 42 of manifold 24, and openings 62, 64, 66 are substantially aligned with air communication ports 44, 46, 48, respectively. In order to obtain a tight seal, a gasket 73 may be interposed between the end wall 42 of manifold 24 and the rear plate 61 of desiccant container 52. Gasket 73 is provided with holes 76, which are aligned with and permit communication between air openings 62, 64, 66 and air communication ports 44, 46, 48, respectively. Gasket 73 may be fabricated of any suitable material, preferably a closed cell silicone rubber or neoprene sponge.

As shown in FIGS. 2 and 4, container 52 also includes flanges 70 carrying quick release fasteners 72 which are adapted to mate with receptacles 74 on air exchange manifold 24, enabling removal and replacement of desiccant cartridge 50. When desiccant cartridge 50 is inserted in manifold 24, viewing windows 58 and handle 60 protrude beyond the edge of cover plate 12, as shown in FIGS. 1, 2 and 3, allowing easy inspection of the desiccant material 54 and facilitating removal of desiccant cartridge 50.

Referring additionally now to FIGS. 3, 7 and 8, ECSS 10 also includes means for filtering the air drawn in by the air exchange means. In the preferred embodiment, the filtering means includes a breather filter, generally designated 78, which is connected in series with the air exchange means, as well as a recirculating air filter assembly, generally designated 80, which is disposed within head/disk compartment 22.

As shown in FIGS. 2 and 3, breather filter 78 is positioned adjacent to apertures 82, which perforate cover plate 12 and provide the only communicating passageway between air exchange manifold 24 and head/disk compartment 22. Breather filter 78 is of conventional construction, having an annular housing 84 which is attached to cover plate 12 by means of screws 86. Housing 84 also includes protective grilles 87, between which is disposed a 0.3 micron filter element 88. An acceptable breather filter is commercially available from Aluminum Filter Company of Carpenteria, Calif.

As shown in FIGS. 3 and 7, recirculating air filter assembly 80 includes a recirculation manifold 90 and a recirculation filter 92, both of which are of conventional construction and are well known in the art. Manifold 90 and filter 92 are preferably of one piece construction, and are secured to the underside of cover plate 12 by means of fasteners 94. As shown best in FIG. 3, manifold 90 has a circular air flow aperture 96, adapted to direct air drawn downward as a result of the negative pressure created by the rotation of the disks and spindle, while filter 92 has a rectangular air inlet aperture 98, inside of which filter element 100 is disposed.

ECSS 10 also includes means for sensing a potentially damaging low pressure condition and means for signalling the occurrence of that condition. As shown best in FIGS. 3 and 4, the barometric sensing and signalling means preferably comprises an altitude pressure switch, generally designated 102. Switch 102 is electromechanical in nature and is mounted on cover plate 12, preferably without head/disk compartment 22, as shown in FIG. 4, although placement of switch 102 on the outside of the disk housing is also contemplated by the present invention. Switch 102 provides an output that signals a low pressure condition, preferably corresponding to an altitude in the range of 8,000-10,000 feet. In the preferred embodiment, switch 102 provides a signal not only when the barometric pressure within head/disk compartment 22 falls below the threshold level, but also provides a different output which signals that the pressure has once again risen above the threshold level. An altitude pressure switch meeting these criteria is the Type 214C40-3, commercially available from Consolidated Controls Corporation of Bethel, Conn.

ECSS 10 also includes means for dissipation of heat, which in the preferred embodiment comprises ribs or fins which are formed integrally with cover plate 12. As shown in FIG. 2, a plurality of fins 104 may be arranged in parallel, spaced relation along the exterior of cover plate 12, where they act to transfer heat generated within head/disk compartment 22 to the outside environment, to be dissipated by natural or forced air cooling. Although the orientation of fins 104 is shown in FIG. 2 as being parallel to the longer dimension of rectangular cover plate 12, this is not essential, and the orientation of fins 104 may be varied in accordance with the type of forced air cooling being used, as set forth hereinbelow.

ECSS 10 also includes means for preventing rapid depressurization of head/disk compartment 22. In the preferred embodiment, the prevention means comprises a flow restrictor connected in series with the air exchange means and located in the vicinity of the air exhaust means. As shown in FIGS. 1, 2 and 6, the flow restrictor preferably takes the form of a plastic cylindrical cap 106, having a calibrated orifice of narrow diameter. Cap 106 can be force-fit directly over the exterior of air outlet check valve 36 and sealed with a gasket, or it can be bonded to the valve body with a conventional adhesive sealant. In an alternative embodiment, the flow restrictor can be placed within air exchange manifold 24, disposed adjacent to air outlet check valve 36. In this embodiment, the flow restrictor would comprise a barrier with an aperture of narrow diameter, formed as part of the casting of manifold 24. In either embodiment, it will be evident to those skilled in the art that the diameter of the opening of the flow restrictor should be chosen so as to limit substantially the rate at which air will flow outward from the head/disk compartment 22 to the ambient.

Figure 9:
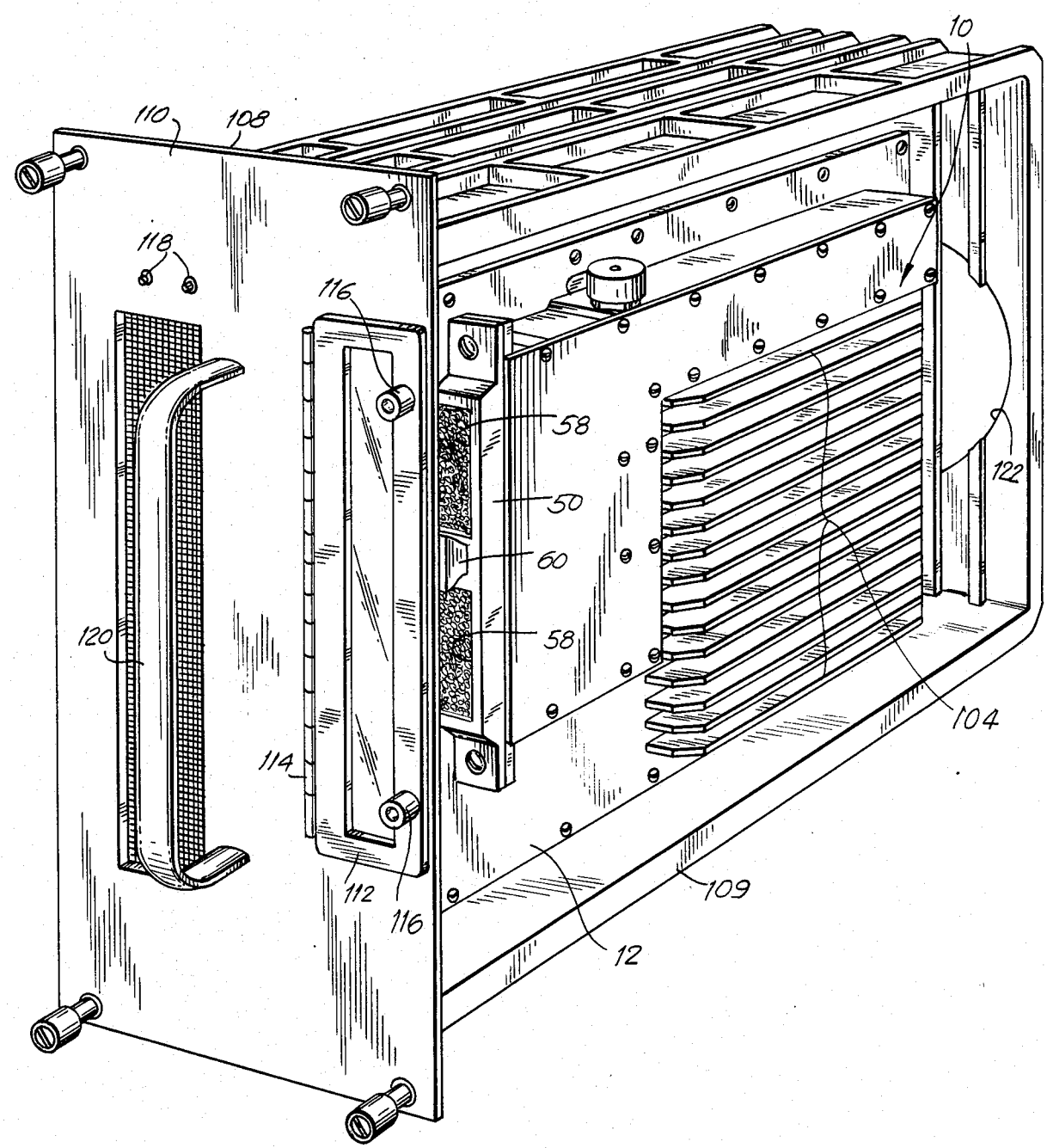
FIG. 9 is a perspective view of a disk-type mass memory unit installed within a housing and incorporating a preferred embodiment of the present invention.

Referring now to the remaining FIGS. 9 and 10 in addition to FIGS. 1-8, an illustrative environment is shown in which the present invention may be utilized. As shown in FIG. 9, a disk drive apparatus incorporating a preferred embodiment of the ECSS may be mounted within a rack mount assembly 108, for installation, e.g., in an aircraft cockpit. Rack mount assembly 108 includes rack mount housing 109, and a cover panel 110 on which a hinged access door 112 is mounted. Door 112 may be biased to the closed position by a spring-loaded hinge 114, or may be secured in that position by means of fasteners 116, which also serve as handles. Access door 112 is positioned such that it is aligned with the viewing windows 58 and handle 60 of desiccant cartridge 50, to permit access to and removal and replacement thereof. Cover panel 110 also may include indicator lamps 118, as well as a rack handle 120 for removal and replacement of the entire rack mounted disk drive apparatus as a single unit.

Rack mount housing 109 preferably includes an aperture 122, adapted to receive a fan (not shown) or other forced air cooling apparatus, and positioned near the fins 104 of ECSS 10. As mentioned hereinabove, the orientation of fins 104 is variable, with that shown in FIG. 9 being preferred in environments in which the heat generated by the disk drive is dissipated by forced air cooling. However, it should be understood that in other environments, the dissipation of heat can be accomplished by natural cooling, in which case the fins 104 can be oriented in the direction perpendicular to that shown in the drawing figures.

As shown in FIG. 10, the rack mount assembly 108 may also preferably include vibration isolators to dampen any vibrational energy transmitted to the disk drive apparatus from the external environment. In the preferred embodiment, the vibration isolators comprise two vibration isolation mounts 124, Type C4H608, available commercially from Aeroflex Laboratories of Plainview, N.Y. Alternatively, however, conventional springs or conical rubber shock mounts may be used as vibration isolators.

Turning now to the operation of ECSS 10, when the air pressure within the head/disk compartment 22 falls below that of the surrounding environment, air will be drawn through the air inlet check valves 32, 34 (as shown by arrows A in FIG. 2), through the desiccant cartridge 50 (as shown by arrow B in FIG. 2) where entrained moisture will be removed, towards the breather filter 78 (as shown by arrow C in FIG. 2) where particles greater than 0.3 microns will be filtered out, and then into the head/disk compartment 22. Inflow of air will continue until the pressure is equalized.

When the air pressure within the head/disk compartment 22 exceeds that of the surrounding environment, air will be expelled back out through the breather filter 78, and out to the surrounding atmosphere (as shown by the arrows D in FIG. 2) through the air outlet check valve 36 and through the flow restrictor 106, which prevents rapid pressure changes.

The orientation of check valves 32, 34, 36 prevents moisture penetration into the desiccant material 54 itself when the system is idle, and also provides proper routing of air when the system is active, preventing backflow of exhaust air. The orientation of the check valves further makes "breathing" as easy as possible, since the air outlet check valve 36 provides a direct path for exhaust air from the breather filter 78 to the outside ambient.

The saturation level of the desiccant material 54 can be monitored by direct observation of the indicating beads through windows 58 of desiccant cartridge 50. As soon as a significant color change is observed, the spent desiccant cartridge can be released, removed and replaced with a fresh cartridge easily.

The baffles 56 within desiccant cartridge 50 not only provide the labyrinth-like interior necessary to induce a tortuous airflow path, thereby improving the efficiency of moisture absorption by increasing the time during which the air is in contact with the desiccant, but they also serve to minimize settling of the desiccant material 54, especially in applications in which the disk drive apparatus is positioned as shown in FIGS. 9 and 10. However, it should be understood by those skilled in the art that any orientation of the entire device is possible.

Heat generated within the head/disk compartment 22 will be transmitted to the cover plate 12 by air, which is being circulated in the compartment by virtue of the rotation of the disks. The heat is then conducted through the cover plate 12, into the fins 104, from which it is then removed by natural or forced air circulation.

The barometric sensing and signalling means measures atmospheric pressure equivalent to altitude within the head/disk compartment 22. When a predetermined altitude is reached, the signal means is activated to initiate an orderly shutdown of the disk drive and thereby prevent subsequent damage to the disks and read/write heads. The signal means can be connected to one of the cover panel indicator lamps, providing a signal to the human operator that manual shutdown of the disk drive unit is required. In an alternative embodiment, however, the signal means can be used to activate appropriate electonic circuitry to cause the computer with which the disk drive is associated to park the read/write heads and shut down the disk drive. Alternatively, the signal means can be connected directly to the disk drive electronics, which would shut down the disk drive without computer or human intervention. Preferably, the signalling means could also be used to initiate a re-start of the disk drive, in a comparable manner, after the low pressure sensing means had determined that a "safe" altitude had once again been reached.

It may be seen from the foregoing that the embodiment described herein is by way of illustration and not of limitation, and that various changes in and other modifications of the construction, composition and arrangement of parts are possible in light of the above teachings. Accordingly, it is to be understood that other embodiments of this invention may be utilized without departing from the spirit and scope of the present invention, as set forth in the appended claims.

I claim:

1. An environmental control appartus for a disk-type mass memory device having at least one sealed head/disk compartment, said apparatus comprising means for exchange of air between said compartment and the atmosphere, means for drying the air drawn in by said air exchange means, means for filtering the air drawn by said air exchange means, means for dissipating heat from within said compartment, means for preventing rapid depressurization of said sealed compartment, means for sensing and signalling a low barometric pressure condition within said compartment and means for interrupting the operation of said mass memory device, said sensing and signalling means comprising an altitiude pressure switch disposed within said sealed compartment, said switch including means for generating an interrupt signal for transmittal to said mass memory device.

2. An apparatus in accordance with claim 1 wherein said altitude pressure switch further includes means for generating a re-start signal for transmittal to said mass memory device.

3. An apparatus in accordance with claim 2 wherein said drying means is positioned in series with said air exchange means such that intake air must travel through said drying means.

4. An apparatus in accordance with claim 3 wherein said air exchange means comprises an air exchange manifold, air intake means disposed on said manifold and air exhaust means disposed on said manifold.

5. An apparatus in accordance with claim 4 wherein said drying means comprises a removable chamber adapted to receive a desiccant material, and wherein said air exchange manifold is adapted to releasably retain said chamber within the path of the intake air stream.

6. An apparatus in accordance with claim 5 wherein said air intake means comprises at least one oneway relief valve, and wherein said air exhaust means comprises at least one one-way relief valve.

7. An apparatus in accordance with claim 6 wherein said air intake means comprises a pair of one-way relief valves, and wherein said air exhaust means comprises one one-way relief valve.

8. An apparatus in accordance with claim 7 wherein said filtering means includes a 0.3 micron breather filter positioned in series with said air exchange means such that intake air and exhaust air must travel through said breather filter.

9. An apparatus in accordance with claim 8 wherein said heat dissipating means comprises a plurality of ribs disposed in parallel spaced relation on the exterior of said compartment.

10. An apparatus in accordance with claim 9 wherein said rapid depressurization prevention means comprises a flow restrictor connected in series with said air exchange means such that exhaust air must travel through said flow restrictor.

11. An apparatus in accordance with claim 10 wherein said flow restrictor comprises a cap having an orifice of narrow diameter and disposed adjacent to the one-way relief valve of said air exhaust means.

* * * * *